US008609797B2

(12) United States Patent
Knepper et al.

(10) Patent No.: US 8,609,797 B2
(45) Date of Patent: Dec. 17, 2013

(54) ROOM TEMPERATURE VULCANIZABLE POLYMERS

(75) Inventors: Jeff A. Knepper, Branchburg, NJ (US); Edward Asirvatham, Chatham, NJ (US); Krishnamoorthi Chinnappan, Thornton, PA (US); Baihua Wu, Newark, DE (US)

(73) Assignee: Honeywell International Inc., Morristown, NJ (US)

( * ) Notice: Subject to any disclaimer, the term of this patent is extended or adjusted under 35 U.S.C. 154(b) by 229 days.

(21) Appl. No.: 12/746,340

(22) PCT Filed: Dec. 28, 2007

(86) PCT No.: PCT/US2007/026400
§ 371 (c)(1),
(2), (4) Date: Oct. 18, 2010

(87) PCT Pub. No.: WO2009/085032
PCT Pub. Date: Jul. 9, 2009

(65) Prior Publication Data
US 2011/0028639 A1 Feb. 3, 2011

(51) Int. Cl.
*C08G 77/08* (2006.01)

(52) U.S. Cl.
USPC .................. 528/18; 528/34; 528/901

(58) Field of Classification Search
USPC .............................. 528/18, 34, 901
See application file for complete search history.

(56) References Cited

U.S. PATENT DOCUMENTS

| 3,189,576 A * | 6/1965 | Edward Sweet ................ 528/35 |
| 3,607,972 A | 9/1971 | Kiles et al. |
| 3,609,178 A | 9/1971 | Thomas |
| 3,962,160 A | 6/1976 | Beers et al. |
| 4,555,560 A | 11/1985 | Saruyama |
| 5,733,960 A * | 3/1998 | Altes et al. ................... 524/432 |

FOREIGN PATENT DOCUMENTS

| EP | 0704494 A | 4/1996 |
| EP | 0713902 A | 5/1996 |
| GB | 1089590 A | 11/1967 |
| WO | 9532245 A | 11/1995 |

OTHER PUBLICATIONS

International Search Report in corresponding International Application PCT/US2007/026400 , May 2008.

* cited by examiner

*Primary Examiner* — Margaret Moore
(74) *Attorney, Agent, or Firm* — Banner & Witcoff, Ltd.

(57) ABSTRACT

A room-temperature vulanizable (RTV) polymeric composition comprising organosiloxane or polyurethane units having at least one terminal methyl isopropyl ketoximino or methyl propyl ketoximino moiety, as well as methods of making the same.

22 Claims, No Drawings

ROOM TEMPERATURE VULCANIZABLE POLYMERS

BACKGROUND

1. Field of Invention

The present invention relates to compositions comprising oxime silane end-capped polymers. More particularly, the invention relates to curable silicon compositions, such as room temperature vulcanizable (RTV) having a oxime cross-linking agent, and to oxime silane end-capped organic polymers, such as polyurethane.

2. Description of Related Art

A silicone sealant or adhesive is a powerful, flexible product that can be used in many different applications. Silicone sealant remains very flexible, even once it has fully cured. Silicone sealant can also withstand very high temperatures, making it ideal for applications involving high heat exposure (e.g., engine gasket sealant). Silicone sealants come in a variety of different forms. For example, one is in a two-component system, requiring the user to mix the two components to make the sealant. The mixture must be made immediately before using it, which makes this type of silicone sealant rather tricky to use.

Silicone sealant may also come as a single product, with no mixing required. One type of single-component silicone sealant is called Room Temperature Vulcanizing (RTV). This form of sealant starts to cure as soon as it is exposed to the air—or, more precisely, the moisture in the air. This simplicity is particularly advantageous in applications such as sealing gaps, joints, and crevices in residential or commercial buildings.

The vulcanizing agent in RTV silicone rubbers is a cross-linking compound or catalyst. In neutral cure silicone sealants, one of the most commercially successful and desired cross-linking systems involves oxime silanes as cross-linker. Silicone sealant and coating systems using these cross-linkers typically enjoy superior shelf life, adhesion, and mechanical properties over that of competing technologies such as acetoxy, alkoxy or amine cross-linked systems. The most abundant and economical of the oxime silanes are those which are characterized by the hydrolyzable groups as being 2-butanone oxime, i.e. methyl ethyl ketoxime (MEKO). For example, U.S. Pat. No. 3,189,576 (Sweet) describes oxime silanes having the general formula $(X=NO)_a SiR'_{4-a}$, methyl ethyl ketoxime.

Despite their popularity, RTV silicones utilizing MEKO as a cross-linking agent have a number of shortcomings. For example, they often suffer from a lack of clarity. (See, e.g., EP660838 B1 describing how the typical use of oxime silane cross-linkers containing methyl ethyl ketoxime provide opaque or cloudy rubber when reacted hydroxyl terminated polydimethylsiloxanes.) Silicone rubber compositions which cure to a clear state are highly desired in the commercial marketplace. Also, an MEKO-based RTV silicone generates MEKO as a volatile by-product via a hydrolysis reaction as the silicone cures. Due to concerns regarding the possible carcinogenic effect of MEKO, in some markets, it is desired to limit the amount of MEKO in RTVs such that the uncured sealant contains less than 1 wt. % of free MEKO.

To limit the amount of MEKO in a sealant, it has been suggested to substitute this compound with various other cross-linking agents. However, all of the substitutes heretofore known in the art have significant disadvantages. For example, one common method of limiting the amount of MEKO in a sealant is to employ silane hybrids which contain both 2-butanone groups and alkoxy groups on the silane cross-linker. However, it is well known that such sealants using these hybrids have insufficient shelf life, require the use of special catalysts and mandate undesirable mix procedures. In addition, such hybrids typically have less than desirable rheological properties.

Other solutions to this problem include the use of silanes containing acetone oxime (propanone oxime). However, this oxime has been found to cause tumors in males rats which strongly suggests that the compound has a toxicity similar to 2-butanone oxime. In addition, since 2-propanone oxime sublimates at fairly low temperatures, sealants which employ this type of cross-linker, when stored in tubes which experience warm temperatures, will find that the sealant bubbles and undesirably yellows during oven aging.

EP660838, suggests using methyl isobutylketoxime (MIBKO) in combination with MEKO to reduce the MEKO concentration in RTV sealants. However, MIBKO-based RTVs have a prolonged period of outgassing of residual oxime which has an unpleasant odor. These same cross-linkers can also be used in combination with 2-butanone based oxime silane cross-linked systems such that the level of free 2-butanone oxime released by the sealant is reduced. However, such sealants still are deficient in that they are marked by a prolonged period of residual odors. Such disadvantages are especially relevant in indoor applications where the applied sealant or coating has little or poor ventilation and the residual odors are detected for several days to weeks after the sealant has been applied to cure.

Therefore, currently there exists a substantial need for cross-linking agents that can be used in a RTV silicone product to improve its odor characteristics, including a shortened period of time that residual odors are emitted. Such cross-linking agents can be used alone, or optionally mixed with 2-butanone oxime silane cross-linkers, in a RTV silicone sealant. The present invention satisfies this need among others.

SUMMARY OF THE INVENTION

Applicants have found that silanes having bis-, tris-, or tetrakis-methyl isopropyl ketoxime (MIPKO) or methyl propyl ketoxime (MPKO) functionality are effective cross-linking agent in RTV silicone compositions and other curable organic polymers, such as polyurethanes. More particularly, the oxime silanes readily hydrolyze in the presence of hydroxyl end-capped organosiloxanes and hydroxyl end-capped organic polymers, wherein the hydroxyl group is replaced with an oxime silane functional group. Subsequent curing of the composition (i.e., exposing the composition to moisture), produces free 2-pentanone oxime (MIPKO) or 3-methyl-2-butanone oxime (MPKO) which are volatile and dissipate in the ambient air.

Surprisingly, MPKO- and MIPKO-based cross-linking agents are far less odiferous compared to MIBKO-based cross-linking agents. The relatively short duration of odor that occurs during the curing of an MPKO- or MIPKO-based polymeric compounds is particularly unexpected in view of the oxime's relatively low vapor pressure (i.e., a vapor pressure that is comparable to that of MIBKO) which would a lingering residual odor. Moreover, Applicants have surprisingly found that, like relatively high molecular weight oxime cross-linkers having MIBKO, the low molecular weight MIPKO also improves the optical properties of rubbers formed by reaction with hydroxyl terminated polydimethylsiloxanes.

Accordingly, one aspect of the present invention is a room-temperature vulanizable (RTV) polymeric composition comprising polymeric units having at least one terminal moiety according to Formula I:

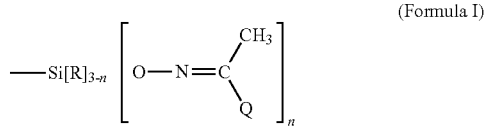
(Formula I)

wherein
Q is

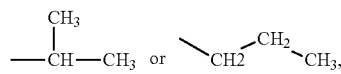

R is independently selected from a branched or straight chain $C_1$-$C_8$ alkyl or alkoxy, $C_3$-$C_6$ cylcoalkyl, $C_2$-$C_5$ alkenyl, aryl, or phenyl, and
n is 2 or 3;
wherein said polymeric units are selected from the group consisting of organosiloxanes, polyether polyols, and derivatives thereof.

Another aspect of the invention provides a method for making a one component RTV silicone system comprising reacting, in the substantial absence of moisture, a hydroxy end-capped organosiloxane with a silane cross-linking agent to produce an oxime end-capped silicone. The cross-linking agent comprises a compound according to Formula III:

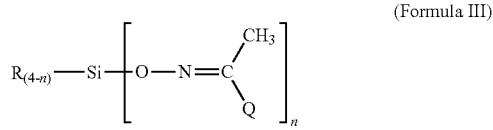
(Formula III)

wherein
Q is

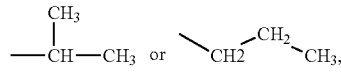

R is independently selected from a branched or straight chain $C_1$-$C_8$ alkyl or alkoxy, $C_3$-$C_6$ cylcoalkyl, $C_2$-$C_5$ alkenyl, aryl, or phenyl, and
n is 2, 3, or 4.

Applicants have found that such RTV silicone compositions are ideally suited for use in one component silicone sealant systems. Accordingly, another aspect of the invention is a one-component RTV silicone sealant system comprising a reactive organosiloxane having at least one terminal methyl isopropyl ketoximino and/or methyl propyl ketoximino moiety.

Another aspect of the invention provides a method for making a curable organic polymer comprising reacting, in the substantial absence of moisture, a mercaptan terminated polyurethane with a silane cross-linking agent to produce an oxime end-capped polyurethane polymer. The cross-linking agent comprises a compound according to Formula V:

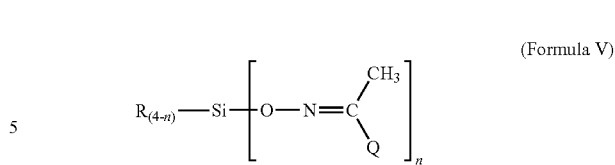
(Formula V)

wherein
Q is

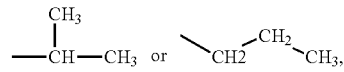

R is independently selected from a branched or straight chain $C_1$-$C_8$ alkyl or alkoxy, $C_3$-$C_6$ cylcoalkyl, $C_2$-$C_5$ alkenyl, aryl, or phenyl, provided that at least one R is vinyl, and n is 2 or 3;

DETAILED DESCRIPTION OF PREFERRED EMBODIMENTS OF THE INVENTION

The room-temperature vulanizable (RTV) silicone compositions of the invention preferably include an organosiloxane having a plurality of terminal moieties independently selected from methyl isopropyl ketoximino and methyl propyl ketoximino. The methyl isopropyl ketoximino and methyl propyl ketoximino functional groups of this compound hydrolyze easily when exposed to water, particularly water vapor such as moisture in ambient air, to produce a free oxime and a modified organosiloxane having at least one terminal hydroxyl functional group. These modified organosiloxanes can subsequently react with other hydroxyl end-capped organosiloxanes and siloxanes to form a highly cross-linked product. Thus, the methyl isopropyl ketoximino and methyl propyl ketoximino functional groups facilitate cross-linking between the reactive organosiloxanes.

According to certain preferred embodiments, the room-temperature vulanizable (RTV) silicone composition comprises organosiloxane units having at least one terminal oxime moiety according to Formula I:

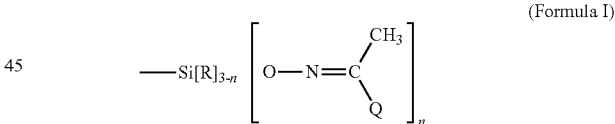
(Formula I)

wherein
Q is

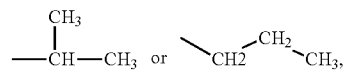

R is independently selected from a branched or straight chain $C_1$-$C_8$ alkyl or alkoxy, $C_3$-$C_6$ cylcoalkyl, $C_2$-$C_5$ alkenyl, aryl, or phenyl, and
n is 2 or 3.

As used herein, the term organosiloxane means a siloxane polymer based on a structure consisting of alternate silicon and oxygen atoms with various organic radicals attached to the silicon.

The organosiloxane units useful in the present invention preferably have a viscosity from about 100 to about 500,000 cP at 25° C., more preferably from about 2000 to about 150,000 cP at 25° C. In certain embodiments, the organosiloxanes comprise diorganosiloxane units.

In certain highly preferred embodiments, the organosiloxane units have a structure according to Formula II(a):

[Formula II(a)]

wherein n varies such that the viscosity of the organosiloxane varies from about 100 to about 350,000 cP. The $R_1$ and $R_2$ organo groups are independently selected from monovalent hydrocarbon radicals or monovalent halogenated carbon radicals. Examples of such monovalent hydrocarbon radicals are methyl, ethyl, propyl, butyl, phenyl, methylphenyl, ethylphenyl, vinyl, allyl, cyclohexyl, tolyl, and isopropyl. Examples of monovalent halogenated hydrocarbon radicals are chloropropyl, 3,3,3-trifluoropropyl, chlorophenyl, beta-(perfluorobutyl)ethyl, and chlorocyclohexyl. Preferably the organic radicals are methyl, ethyl, phenyl, vinyl, and 3,3,3-trifluoropropyl.

Terminal oxime moieties of the organosiloxane unit are preferably substituted silanes having mono-, di- or tris-oxime functionality. Preferred oxime functional groups include methyl isopropyl ketoximino, methyl propyl ketoximino, and combinations of these. In addition to the ketoximino substituents, mono- and di-oxime silanes can include other substituents selected from branched or straight chain $C_1$-$C_8$ alkyls or alkoxys, $C_3$-$C_6$ cycloalkyls, $C_2$-$C_5$ alkenyls, aryls, and phenol. Preferred terminal oxime moieties include, but are not limited to, tris-(methyl isopropyl ketoximino)silane, methyl bis-(methyl isopropyl ketoximino)silane, ethyl bis-(methyl isopropyl ketoximino)silane, vinyl bis-(methyl isopropyl ketoximino)silane, propyl bis-(methyl isopropyl ketoximino)silane, phenyl bis-(methyl isopropyl ketoximino)silane, dimethyl(methyl isopropyl ketoximino)silane, methyl ethyl (methyl isopropyl ketoximino)silane, methyl vinyl (methyl isopropyl ketoximino)silane, tris-(methyl propyl ketoximino)silane, methyl bis-(methyl propyl ketoximino)silane, ethyl bis-(methyl propyl ketoximino)silane, vinyl bis-(methyl propyl ketoximino)silane, propyl bis-(methyl propyl ketoximino)silane, phenyl bis-(methyl propyl ketoximino)silane, dimethyl (methyl propyl ketoximino)silane, methyl ethyl (methyl propyl ketoximino)silane, and methyl vinyl (methyl propyl ketoximino)silane.

Certain embodiments of the invention are directed to a method of making a one component RTV silicone system having the RTV silicone composition described herein. In certain preferred embodiments, the method involves reacting, in the substantial absence of moisture, a hydroxy end-capped organosiloxane with a silane cross-linking agent to produce an oxime end-capped siloxane polymer. The cross-linking agent comprises a compound according to Formula III:

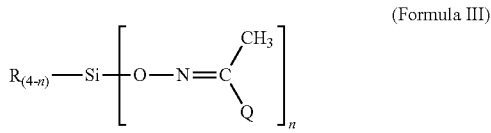
(Formula III)

wherein
Q is

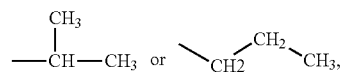

R is independently selected from a branched or straight chain $C_1$-$C_8$ alkyl or alkoxy, $C_3$-$C_6$ cylcoalkyl, $C_2$-$C_5$ alkenyl, aryl, or phenyl, and
n is 2, 3, or 4.

In certain preferred embodiments, R is methyl, vinyl, and/or phenyl.

The cross-linking agent may also includes the partial hydrolysis condensation products (such as dimers, trimers and oligomers) from reaction to environmental moisture or process moisture. The process for preparing such ketoximino silanes are well known and may be prepared by any means known in the art, such as those described in U.S. Pat. No. 4,033,991, U.S. Pat. No. 4,400,527, and U.S. Pat. No. 4,918,209.

In certain preferred embodiments, the cross-linking agent consists essentially of one or more compounds according to Formula III. In certain other embodiment of the invention employ as cross-linking agents mixtures of methyl isopropyl ketoximino silanes and/or methyl propyl ketoximino silanes with minority amounts of additional cross-linking compounds, which can be selected from silane cross-linkers known in the art such as an alkyl or alkenyl tris-(methylethylketoximino)silane, an alkyl or alkenyl tris-(methyl isobutyl ketoximino)silane, an alkyl or alkenyl di(methoxy)(oximino) silane, or an alkyl or alkenyl di-(ketoximino)methoxy or ethoxy silane. Illustrative of such cross-linkers are silanes of the formula $R_a$—Si(OR')$_p$(ON=CR"$_2$)$_{4-p}$, where $R_a$ is independently methyl, ethyl, vinyl or phenyl, a is 0 to 2, p is 0 to 4, R' and R" may be any saturated straight chain or branched alkyl radical of 1 to 8 carbon atoms. Further illustrative of other optional silane cross-linkers which can be employed include, but are not limited to, methyl tris-(methyl ethyl ketoximino)silane, methyl di-(methylethylketoximino)methoxy silane, methyl (methylethylketoximino)dimethoxy silane, vinyl di-(methylethylketoximino)methoxy silane, vinyl (methylethylketoximino)dimethoxy silane, vinyl di(methyl methyl ketoximino)methoxy silane, vinyl di(methoxy) methyl methyl ketoximino silane, vinyl tris-(methyl ethyl ketoximino)silane, methyl tris-(methyl isobutyl ketoximino) silane, vinyl tris-(methyl isobutyl ketoximino)silane, tetrakis-(methyl ethyl ketoximino)silane, tetrakis-(methyl isobutyl ketoximino)silane, and tetrakis-(methyl amyl ketoximino)silane. Difunctional ketoximino silanes may also be used such as dimethyl di-(methyl ethyl ketoximino)silane, methyl vinyl di-(methyl ethyl ketoximino)silane, methyl vinyl di-(methyl isobutyl ketoximino)silane, and methyl vinyl di-(methyl amyl ketoximino)silane.

It is desirable to use these additional cross-linkers at levels below about 50 percent of the total cross-linker level. Using additional cross-linkers at higher concentrations generally increases the retention time of residual odors of the cured composition and/or decreases the clarity of the resulting sealant or coating. For example, mixing methyl isopropyl ketoximino-based cross-linking agents with small amounts of silane cross-linkers containing methylethylketoxime, will tend to decrease the clarity in the cured silicone rubber; whereas mixing methyl isopropyl ketoximino-based cross-linking agents with silane cross-linkers containing methyl isobutyl ketoximine will result in an increase in residual odor of the cured silicone rubber.

Preferred hydroxy end-capped organosiloxanes involved in this method are hydroxyl endblocked diorganosiloxanes having a viscosity between about 100 to about 500,000 cP at 25° C., preferably from about 2000 to about 150,000 cP at 25° C. These diorganosiloxanes preferably have a structure according to Formula II(b):

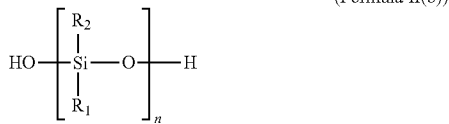

(Formula II(b))

where n, R1 and R2 defined as in Formula III(a).

The present invention also provides one-component RTV silicone sealant systems comprising a reactive organosiloxane having at least one terminal methyl isopropyl ketoximino and/or methyl propyl ketoximino moiety.

As used herein the term reactive organosiloxane means an organosiloxane that has a propensity to cross-link with other organosiloxanes or to react with a cross-linking agent.

In certain embodiments, the sealant system contains a blend of the reactive organosiloxane, hydroxyl end-capped organosiloxanes, and silane cross-linking agents having bis-, tris-, or tetrakis-methyl isopropyl ketoximino and/or methyl propyl ketoximino functionality. The blend may also comprise one or more additives selected from non-reactive silicone polymers, plasticizers, fillers, catalysts, and adhesion promoters.

Plasticizers can be used to improve extrusion properties of the sealant and to modify modulus of the cured composition. Generally, the plasticizer is added to the reactive organosiloxane before the cross-linker is added.

Well known plasticizers include triorganosilyl endblocked diorganopolysiloxanes, preferably those having a viscosity ranging from 10 to 100,000 cP at 25° C., diorganopolysiloxanes, preferably those having a viscosity ranging from 100 to 1000 cP at 25° C., and organic plasticizers, preferably those having a viscosity ranging between 1 and 1000 cP. Other organic plasticizers as known in the art can be used as well, such as compatible cycloparaffinic oils paraffinic oils, and other long chain non-reactive organic oil extenders which do not bleed or have significant evaporation from the cured sealant. Use of these oils may have some long term effects on the performance of the sealant such as lower elongation and increased stiffening of the sealant.

Preferably, plasticizer are present in a concentration from 0 to 80 parts by weight, more preferably 30 to 50 parts by weight, per 100 parts by weight based upon the weight of the reactive organosiloxane.

In certain embodiments, the sealant system also contains a filler. The filler can be a reinforcing filler or non-reinforcing filler or mixtures thereof. Examples of reinforced fillers are silica fillers, such as, fumed silica and precipitated silica. The fumed silica can be used as is or treated to provide a hydrophobic surface. Examples of treated fillers are polydimethylsiloxane, octamethylcyclotetrasiloxane, or hexamethyldisilazane. Although the amount and type of filler will vary with the desired properties for the end composition, preferably, fumed silicas are used which have surface areas ranging from 90 to 300 m$^2$/gram. More preferably, fumed silicas with surface areas of 130 to 200 m$^2$/gram are used. The amounts of reinforcing filler used is 0 to 20 percent by weight of the total composition; and it is preferred to use 2 to 8 percent by weight. Use of reinforcing fumed silicas impart increased tensile strength of the cured composition as well as providing thixotropic character to the uncured composition. A non-reinforcing or semi-reinforcing filler can also be used. Examples of such fillers are fillers with surface areas of 2 to 90 m$^2$/gm such as ground or precipitated calcium carbonate (treated and untreated), and ground quartz etc. Other semi-reinforcing fillers or extending fillers which are known in the art may be used. These are but are not limited to silica aerogel, diatomaceous earth, iron oxide, titanium oxide, aluminum oxide, zirconium silicate, calcined clay, magnesium oxide, talc, wollastonite, hydrated alumina, and carbon black.

In certain preferred embodiments, the composition of the present invention may also contain an adhesion promoter. Selection of an adhesion promoter will vary with the desired application since the choice of adhesion promoter can significantly effect the degree of adhesion to substrates. The selection of adhesion promoter can also effect cure speed and modulus of the composition as well. Typically an adhesion promoter can be chosen from many organofunctional silanes known in the art. Such silanes typically have a propylene group (as the bridging group) between the functional group and the silicon atom and take the form of an organopropyl tri or di-alkoxysilane. In some the cases the organofunctional silane may contain a methylene bridge between the functional group and the silicon atom and takes the form of an organo methyl tri or di-alkoxy silane. The functional group is typically an amino, epoxy, glycidoxy, sulfur, ureido, methacryloxy or acryloxy group. Examples of such silanes include, but are not limited to, aminopropyltriethoxysilane, aminopropyltrimethoxysilane, N-(2-aminoethyl)-3-aminopropyl-triethoxysilane, N-(2-aminoethyl)-3-aminopropyltrimethoxysilane, trimethoxysilylpropyldiethylene triamine, 3-glycidoxypropyltrimethoxy silane, N-cyclohexyl-3-aminopropyltrimethoxysilane, gamma-mercaptopropyltrimethoxysilane, gamma-methacryloxypropyltrimethoxysilane, and their organo methyl dialkoxy variants (such as for example aminopropylmethyldiethoxysilane). Preferred adhesion useful in this present invention include aminopropyltrialkoxysilanes (e.g., N-(2-aminoethyl)-3-aminopropyl-trialkoxysilanes) and trialkoxysilylpropyldiethylene triamines. Useful concentrations of adhesion promoters in the claimed invention range from about 0.001 to about 2.5 percent by weight of the total composition. More preferably 0.5 to 1.0 percent by weight of the total composition is used. Mixtures of two or more of the adhesion promoters stated above can also be used, usually to obtain improved properties such as improved resistance to hydrolysis, or improved adhesion.

The sealant system can also comprise a catalyst to facilitate the reaction between hydroxyl end-capped organosiloxanes and the silane cross-linking agent. Various catalysts can be used, for example organotin carboxylates such as dibutyltindilaurate, dibutyltindiacetate, dibutyltin dioctoate, dibutyltinmaleate, dialkyl tin hexoates, and dioctyltindilaurate, etc. Other compounds as well can be used such as iron octanoate, zinc octanoate, lead octanoate, cobalt naphthenate etc. Titanium compounds may also be used such as tetrapropyltitanate, tetrabutyltitanate, tetraisopropyltitanate, etc. Dibutyltindilaurate is the preferred catalyst. Useful levels of catalyst can range from 0.001 to 1.0 percent of the total composition. Preferred levels are 0.02 to 0.15 percent by weight of the total composition.

The compositions of this invention can particularly serve a variety of applications such as providing coating and sealing materials especially where clarity of the cured rubber is critical. In addition, they serve other much needed applications where the free 2-butanone oxime level is limited to less than 1 percent by weight.

Certain preferred embodiments of the invention involve an organic polymer having methyl isopropyl ketoximino and methyl propyl ketoximino functionality. Preferably the organic polymer is a polyether polyol derivative, such as a mercaptan terminated polyurethane. The oxime silane-terminated polyurethane can be synthesized, for example, by reacting a polyethylene glycol or polypropylene glycol with a diisocynate to form a polyurethane. This polyurethane can subsequently undergo a reaction with mercapto alcohol or a allyl alcohol/dimercaptan alkyl combination to form a mercaptan terminated polyurethane. Reacting the mercaptan terminated polyurethane with a cross linking agent, such as an MPKO or MIPKO silane having at least one vinyl group (e.g., methyl vinyl di(MPKO) silane), will result in a MPKO or MIPKO terminated polyurethane. Here, the vinyl group of the cross-linking agent reacts with the mercapto group on the polyurethane to form the oximino end-capped polyurethane.

When the oximino end-capped polyurethane is exposed to moisture, it will facilitate the cross-linking of the polyurethane units in a manner similar to that of the organosiloxanes described above.

MPKO-based silane cross-linking agents of the present invention may be prepared using the process described in U.S. Pat. No. 4,400,527, which is incorporated herein by reference. Surprisingly, the MPKO silane is the only C-5 oxime isomer that forms a liquid phase according to this process and, therefore, it is the only C-5 oxime isomer that can be produced via this process. Thus, MPKO silanes may be prepared by reacting, in the liquid phase, an Si-halide of the formula $R_{4-n}SiX_n$ with an oxime compound of the formula $R'R''C=NOH$, at a mole ratio of oxime compound to Si-halide of at least 2n:1 to form a product of the formula $(R'R''C=NO)_nSiR_{4-n}$ and an oxime hydrohalide by-product of the formula $R'R''C=NOH.HX$; and separating the product from the by-product oxime by separating a liquid organic phase consisting essentially of the product from a phase consisting essentially of the by-product; wherein R is alkyl of 1-6 carbons, alkenyl of 2-6 carbons, aryl, aralkyl, cycloalkyl or halogen-substituted forms thereof; X is Cl, Br or I; n is 1 to 4; R' is methyl; and R" is n-propyl. The process may optionally include the steps of reacting the liquid organic phase consisting essentially of the product with ammonia to convert the oxime hydrohalide impurity to said product and a solid salt; and removing the solid salt from the remaining liquid.

EXAMPLES

The examples provided below illustrate the present invention and its usefulness. The present invention is not limited, however, to these examples. All parts in the examples are by weight.

Example 1

Compositions 1-7 of this example clearly demonstrate the improved optical properties of oxime silane cross-linkers containing a methyl isopropyl ketoximine or methyl isopropyl ketoximine moiety as the hydrolyzable group.

Composition 1:
To a 100 ml container was added 50 parts by weight of hydroxyl terminated polydimethyl siloxane (HTPDMS) having a viscosity of 50,000 centistokes. Then, 2 parts by weight of methyl tris-(methyl isopropyl ketoximino)silane was added. The compound was mixed for 18 seconds in a laboratory Hauschild rotational speed mixer. The composition cures to a clear silicone rubber.

Comparative Composition 1(A):
To a 100 ml container was added 50 parts by weight of hydroxyl terminated polydimethyl siloxane (HTPDMS) having a viscosity of 50,000 centistokes. Then, 2 parts by weight of methyl tris-(methyl ethyl ketoximino)silane was added. The compound was mixed for 18 seconds in a laboratory Hauschild rotational speed mixer. The above composition cures to a cloudy silicone rubber.

Composition 2:
To a 100 ml container was added 50 parts by weight of hydroxyl terminated polydimethyl siloxane (HTPDMS) having a viscosity of 50,000 centistokes. Then, 2.5 parts by weight of methyl tris-(methyl isopropyl ketoximino)silane was added. The compound was mixed for 18 seconds in a laboratory Hauschild rotational speed mixer. The above composition cures to a clear silicone rubber.

Comparative Composition 2(A):
To a 100 ml container was added 50 parts by weight of hydroxyl terminated polydimethyl siloxane (HTPDMS) having a viscosity of 50,000 centistokes. Then, 2.5 parts by weight of methyl tris-(methyl ethyl ketoximino)silane was added. The compound was mixed for 18 seconds in a laboratory Hauschild rotational speed mixer. The above composition cures to a cloudy silicone rubber.

Composition 3:
To a 100 ml container was added 50 parts by weight of hydroxyl terminated polydimethyl siloxane (HTPDMS) having a viscosity of 50,000 centistokes. Then 3.0 parts by weight of methyl tris-(methyl isopropyl ketoximino)silane was added. The compounds was mixed for 18 seconds in a laboratory Hauschild rotational speed mixer. The above composition cures to a clear silicone rubber.

Comparative Composition 3(A):
To a 100 ml container was added 50 parts by weight of hydroxyl terminated polydimethyl siloxane (HTPDMS) having a viscosity of 50,000 cP. Then 3.0 parts by weight of methyl tris-(methyl ethyl ketoximino)silane was added. The compound was mixed for 18 seconds in a laboratory Hauschild rotational speed mixer. The above composition cures to a cloudy silicone rubber.

Composition 4:
To a 100 ml container was added 50 parts by weight of hydroxyl terminated polydimethyl siloxane (HTPDMS) having a viscosity of 20,000 centistokes. Then, 4.0 parts by weight of methyl tris-(methyl isopropyl ketoximino)silane was added. The compound was mixed for 18 seconds in a laboratory Hauschild rotational speed mixer. The above composition cures to a clear silicone rubber.

Comparative Composition 4(A):
To a 100 ml container was added 50 parts by weight of hydroxyl terminated polydimethyl siloxane (HTPDMS) having a viscosity of 20,000 centistokes. Then, 4.0 parts by weight of methyl tris-(methyl ethyl ketoximino)silane was added. The compound was mixed for 18 seconds in a laboratory Hauschild rotational speed mixer. The above composition cures to a cloudy silicone rubber.

Composition 5:
To a 100 ml container was added 50 parts by weight of hydroxyl terminated polydimethyl siloxane (HTPDMS) having a viscosity of 20,000 centistokes. Then, 3.0 parts by weight of vinyl tris-(methyl isopropyl ketoximino)silane was added. The compound was mixed for 18 seconds in a laboratory Hauschild rotational speed mixer. The above composition cures to a clear silicone rubber.

Comparative Composition 5(A):
To a 100 ml container was added 50 parts by weight of hydroxyl terminated polydimethyl siloxane (HTPDMS) having a viscosity of 20,000 centistokes. Then, 3.0 parts by weight of vinyl tris-(methyl ethyl ketoximino)silane was added. The compound was mixed for 18 seconds in a laboratory Hauschild rotational speed mixer. The above composition cures to a cloudy silicone rubber.

Composition 6:

To a 100 ml container was added 50 parts by weight of hydroxyl terminated polydimethyl siloxane (HTPDMS) having a viscosity of 50,000 centistokes. Then 2.5 parts by weight of methyl tris-(methyl isopropyl ketoximino)silane and 0.5 parts of methyl vinyl bis-(methyl isopropyl ketoximino)silane was added. The compound was mixed for 18 seconds in a laboratory Hauschild rotational speed mixer. The above composition cures to a clear silicone rubber.

Comparative Composition 6(A):

To a 100 ml container was added 50 parts by weight of hydroxyl terminated polydimethyl siloxane (HTPDMS) having a viscosity of 50,000 centistokes. Then 2.5 parts by weight of methyl tris-(methyl ethyl ketoximino)silane and 0.5 parts of methyl vinyl bis-(methyl ethyl ketoximino)silane was added. The compound was mixed for 18 seconds in a laboratory Hauschild rotational speed mixer. The above composition cures to a cloudy silicone rubber.

Composition 7:

To a 100 ml container was added 50 parts by weight of hydroxyl terminated polydimethyl siloxane (HTPDMS) having a viscosity of 50,000 centistokes. Then, 2.5 parts by weight of methyl tris-(methyl isopropyl ketoximino)silane and 0.5 parts of tetrakis-(methyl isopropyl ketoximino)silane was added. The compound was mixed for 18 seconds in a laboratory Hauschild rotational speed mixer. The above composition cures to a clear silicone rubber.

Comparative Composition 7(A):

To a 100 ml container was added 50 parts by weight of hydroxyl terminated polydimethyl siloxane (HTPDMS) having a viscosity of 50,000 centistokes. Then, 2.5 parts by weight of methyl tris-(methyl ethyl ketoximino)silane and 0.5 parts of tetrakis-(methyl ethyl ketoximino)silane was added. The compound was mixed for 18 seconds in a laboratory Hauschild rotational speed mixer. The above composition cures to a cloudy silicone rubber.

Example 2

The following compositions demonstrate how sealants formulated with oxime silane cross-linkers containing the methyl-isopropyl ketoxime moiety or methyl propyl ketoxime moiety have less residual odor upon curing and produce sealants with low free MEKO (methyl ethyl ketoximine) content. In all cases, the comparative compositions demonstrate how the selection of silanes containing either methyl propyl ketoxime or methyl isopropyl ketoxime are superior to those containing methyl isobutyl ketoxime with respect to the generation of residual odors and still provide sealants free MEKO levels below 1%. In each comparative the set, the same molar equivalent of cross-linker was added to the formulations in order to objectively compare the odor levels. Free MEKO (2-butanone oxime) content was measured by performing a heptane extraction of the sealant sample under anhydrous conditions (nitrogen gas), and quantitatively determining the content level by gas chromatography (using the appropriate response factor as described by the Honeywell Free MEKO Analytical Method).

Composition 8:

A common commercially available silanol terminated polydimethylsiloxane (65.15) parts by weight, having a viscosity at 25° C. of 50,000 cP was thoroughly mixed with a triorganosilyl end-capped diorganopolysiloxane (20 parts by weight) having a viscosity of 1000 cP at 25° C. The components were mixed in a Hauschild mixer for 18 seconds. To this mixture was added 5.7 (0.0166 moles) parts of methyl tris-(methyl isopropyl ketoximino)silane as cross-linker. This silane was mixed for 18 seconds in the same mixer. Next, 8.0 part of untreated fumed silica (150 $m^2$/gm surface area) was added to the mixture and then mixed in a similar fashion. To this mixture 1.0 parts of gamma-aminopropyltriethoxysilane was added and similarly mixed. Dibutyltindilaurate was added last (0.15 parts) and mixed for 18 seconds in the Hauschild mixer. The resulting rubber cured with a medium level residual odor in the first 48 hours and was odor free after 96 hours (see Table I). After a heptane extraction of the uncured sealant, the fee MEKO content was measured by Gas Chromatography to be 0% (i.e. undetectable).

Composition 8A:

A composition was prepared identical to that of composition 8, except that methyl tris-(methyl propyl ketoximino)silane was substituted as cross-linker for methyl tris-(methyl isopropyl ketoximino)silane. The resulting rubber cured with a medium level residual residual odor in the first 48 hours and was odor free after 96 hours (see Table I). After a heptane extraction of the uncured sealant, the fee MEKO content was measured by Gas Chromatography to be 0% (i.e. undetectable).

Comparative Composition 8(B):

As in composition 8, a silanol terminated polydimethylsiloxane (64.45) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added 6.4 (0.0166 moles) parts by weight of methyl tris-(methyl isobutyl ketoximino)silane as cross-linker. This silane was mixed for 18 seconds in the same mixer. Next was added 8.0 parts by weight of untreated fumed silica (150 $m^2$/gm surface area) mixed in the same manner. To this mixture 1.0 parts by weight of gamma-aminopropyltriethoxysilane was added and similarly mixed. Dibutyltindilaurate was added last (0.15 parts by weight) and mixed for 18 seconds in the Hauschild mixer. The resulting rubber cured with a high residual odor lasting several days (see Table I). After a heptane extraction of the uncured sealant, the fee MEKO content was measured by Gas Chromatography to be 0% (i.e. undetectable) global charge for "0" Gas Chromatography results in Example section.

Composition 9:

A silanol terminated polydimethylsiloxane (65.4) parts by weight having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added the combination of 1.0 (0.00332 moles) parts by weight of methyl tris-(methyl ethyl ketoximino)silane, 1.0 (0.00319 moles) parts by weight vinyl tris-(methyl ethyl ketoximino)silane, and 3.5 (0.01019 moles) parts by weight of methyl tris-(methyl isopropyl ketoximino)silane as a cross-linker. This combination of silanes was mixed for 18 seconds in the same mixer. Next was added 8.0 parts by weight of untreated fumed silica (150 $m^2$/gm surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with a low residual odor lasting less than 48 hours (see Table I). After a heptane extraction of the uncured sealant, the fee MEKO content was measured by Gas Chromatography to be less than 1%.

Comparative Composition 9(A):

An identical composition was made to that of Composition 9, except that methyl tris-(methyl propyl ketoximino)silane was substituted as cross-linker for methyl tris-(methyl isopropyl ketoximino)silane. The resulting rubber cured with a low residual odor lasting less than 48 hours (see Table I). After a heptane extraction of the uncured sealant, the fee MEKO content was measured by Gas Chromatography to be less than 1%.

Comparative Composition 9(B):

As in composition 9, a silanol terminated polydimethylsiloxane (65.97) parts by weight having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added the combination of 1.0 (0.00332 moles) parts by weight of methyl tris-(methyl ethyl ketoximino)silane, 1.0 (0.00319 moles) parts by weight vinyl tris-(methyl ethyl ketoximino) silane, and 3.93 (0.01019 moles) parts by weight of methyl tris-(methyl isobutyl ketoximino)silane as cross-linker. This combination of silanes was mixed for 18 seconds in the same mixer. Next was added 8.0 parts by weight of untreated fumed silica (150 m²/gm surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with a high residual odor lasting several days (see Table I). After a heptane extraction of the uncured sealant, the fee MEKO content was measured by Gas Chromatography to be less than 1%.

Composition 10:

A silanol terminated polydimethylsiloxane (39.15) parts by weight, having a viscosity at 25° C. of 50,000 cP was thoroughly mixed with a triorganosilyl endblocked diorganopolysiloxane (15 parts by weight) having a viscosity of 1000 cP at 25° C. The components were mixed in a Hauschild mixer for 18 seconds. To this mixture was added 5.7 (0.0166 moles) parts of methyl tris-(methyl isopropyl ketoximino) silane as cross-linker. This silane was mixed for 18 seconds in the same mixer. Next was added 35 parts (by weight) of a 3 micron (average particle size) stearic acid treated calcium carbonate filler which was mixed into the mixture similarly as other additions. Next was added 4.0 parts by weight of an untreated fumed silica (150 m²/gm surface area) mixed in the same manner. To this mixture 1.0 parts by weight of gamma-aminopropyltriethoxysilane was added and similarly mixed. Dibutyltindilaurate was added last (0.15 parts by weight) and mixed for 18 seconds in the Hauschild mixer. The resulting rubber cured with very low residual odor in the first 48 hours and was nearly odor free after 72 hours (see Table I). After a heptane extraction of the uncured sealant, the fee MEKO content was measured by Gas Chromatography to be 0% (i.e. undetectable).

Comparative Composition 10(A):

An identical composition was made to that of composition 10, except that methyl tris-(methyl propyl ketoximino)silane was substituted as cross-linker for methyl tris-(methyl isopropyl ketoximino)silane. The resulting rubber cured with very low residual odor in the first 48 hours and was nearly odor free after 72 hours (see Table I). After a heptane extraction of the uncured sealant, the fee MEKO content was measured by Gas Chromatography to be 0% (i.e. undetectable).

Comparative Composition 10(B):

As in Composition 10, a silanol terminated polydimethylsiloxane (38.45) parts by weight, having a viscosity at 25° C. of 50,000 cP was thoroughly mixed with a triorganosilyl endblocked diorganopolysiloxane (15 parts by weight) having a viscosity of 1000 cP at 25° C. The components were mixed in a Hauschild mixer for 18 seconds. To this mixture was added 6.4 (0.0166 moles) parts of methyl tris-(methyl isobutyl ketoximino)silane as cross-linker. This silane was mixed for 18 seconds in the same mixer. Next was added 35 parts (by weight) of a 3 micron (average particle size) stearic acid treated calcium carbonate filler which was mixed into the mixture similarly as other additions. Next was added 4.0 parts by weight of an untreated fumed silica (150 m²/gm surface area) mixed in the same manner. To this mixture 1.0 parts by weight of gamma-aminopropyltriethoxysilane was added and similarly mixed. Dibutyltindilaurate was added last (0.15 parts by weight) and mixed for 18 seconds in the Hauschild mixer. The resulting rubber cured with a high initial residual odor lasting several days (see Table I). After a heptane extraction of the uncured sealant, the fee MEKO content was measured by Gas Chromatography to be 0% (i.e. undetectable).

Composition 11:

A silanol terminated polydimethylsiloxane (39.4) parts by weight, having a viscosity at 25° C. of 50,000 cP was thoroughly mixed with a triorganosilyl endblocked diorganopolysiloxane (15 parts by weight) having a viscosity of 1000 cP at 25° C. The components were mixed in a Hauschild mixer for 18 seconds. To this mixture was added a combination of 1.0 (0.00332 moles) parts by weight of methyl tris-(methyl ethyl ketoximino)silane, 1.0 (0.00319 moles) parts by weight vinyl tris-(methyl ethyl ketoximino)silane, and 3.5 (0.01019 moles) parts by weight of methyl tris-(methyl isopropyl ketoximino)silane as cross-linker. This combination of silanes was mixed for 18 seconds in the same mixer. Next, 35 parts (by weight) of a 3 micron (average particle size) stearic acid treated calcium carbonate filler which was mixed into the mixture similarly as other additions. Next was added 4.0 parts by weight of an untreated fumed silica (150 m²/gm surface area) mixed in the same manner. To this mixture 1.0 parts by weight of gamma-aminopropyltriethoxysilane was added and similarly mixed. Dibutyltindilaurate was added last (0.15 parts by weight) and mixed for 18 seconds in the Hauschild mixer. The resulting rubber cured with a low initial residual odor in the first 48 hours and was nearly odor free after 72 hours (see Table II). After a heptane extraction of the uncured sealant, the fee MEKO content was measured by Gas Chromatography to be less than 1%.

Comparative Composition 11(A):

An identical composition was made to that of composition 11, except that methyl tris-(methyl propyl ketoximino)silane was substituted as cross-linker for methyl tris-(methyl isopropyl ketoximino)silane. The resulting rubber cured with a low initial residual odor in the first 48 hours and was nearly odor free after 72 hours (see Table II). After a heptane extraction of the uncured sealant, the fee MEKO content was measured by Gas Chromatography to be less than 1%.

Comparative Composition 11(B):

As in composition 11, a silanol terminated polydimethylsiloxane (38.78) parts by weight, having a viscosity at 25° C. of 50,000 cP was thoroughly mixed with a triorganosilyl endblocked diorganopolysiloxane (15 parts by weight) having a viscosity of 1000 cP at 25° C. The components were mixed in a Hauschild mixer for 18 seconds. To this mixture was added a combination of 1.0 (0.00332 moles) parts by weight of methyl tris-(methyl ethyl ketoximino)silane, 1.0 (0.00319 moles) parts by weight vinyl tris-(methyl ethyl ketoximino)silane, and 3.92 (0.01019 moles) parts by weight of methyl tris-(methyl isobutyl ketoximino)silane as cross-linker. This combination of silanes was mixed for 18 seconds in the same mixer. Next, 35 parts (by weight) of a 3 micron (average particle size) stearic acid treated calcium carbonate filler which was mixed into the mixture similarly as other additions. Next was added 4.0 parts by weight of an untreated fumed silica (150 $m^2/gm$ surface area) mixed in the same manner. To this mixture 1.0 parts by weight of gamma-aminopropyltriethoxysilane was added and similarly mixed. Dibutyltindilaurate was added last (0.15 parts by weight) and mixed for 18 seconds in the Hauschild mixer. The resulting rubber cured with an initial high residual odor lasting several days (see Table II). After a heptane extraction of the uncured sealant, the fee MEKO content was measured by Gas Chromatography to be less than 1%.

Composition 12:

A silanol terminated polydimethylsiloxane (66.4) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added a combination of 1.0 (0.00332 moles) parts by weight of methyl tris-(methyl ethyl ketoximino)silane, 1.0 (0.00319 moles) parts by weight vinyl tris-(methyl ethyl ketoximino)silane, and 2.5 (0.00728 moles) parts by weight of methyl tris-(methyl isopropyl ketoximino)silane as cross-linker. This combination of silanes was mixed for 18 seconds in the same mixer. Next was added 8.0 parts by weight of a dimethyldichlorosilane treated fumed silica (150 $m^2/gm$ surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with very low residual odor in the first 48 hours and was odor free after 72 hours (see Table II). After a heptane extraction of the uncured sealant, the fee MEKO content was measured by Gas Chromatography to be less than 1%.

Comparative Composition 12(A):

An identical composition was made to that of composition 12, except that methyl tris-(methyl propyl ketoximino)silane was substituted as cross-linker for methyl tris-(methyl isopropyl ketoximino)silane. The resulting rubber cured with very low residual odor in the first 48 hours and was odor free after 72 hours (see Table II). After a heptane extraction of the uncured sealant, the fee MEKO content was measured by Gas Chromatography to be less than 1%.

Comparative Composition 12(B):

As in composition 12, a silanol terminated polydimethylsiloxane (66.1) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added a combination of 1.0 (0.00332 moles) parts by weight of methyl tris-(methyl ethyl ketoximino)silane, 1.0 (0.00319 moles) parts by weight vinyl tris-(methyl ethyl ketoximino) silane, and 2.8 (0.00726 moles) parts by weight of methyl tris-(methyl isobutyl ketoximino)silane as cross-linker. This combination of silanes was mixed for 18 seconds in the same mixer. Next was added 8.0 parts by weight of a dimethyldichlorosilane treated fumed silica (150 $m^2/gm$ surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with an initial high residual odor lasting several days (see Table II). After a heptane extraction of the uncured sealant, the fee MEKO content was measured by Gas Chromatography to be less than 1%.

Comparative Composition 12(C):

As in composition 12, a silanol terminated polydimethylsiloxane (66.4) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added a combination of 1.0 (0.00332 moles) parts by weight of methyl tris-(methyl ethyl ketoximino)silane, 1.0 (0.00319 moles) parts by weight vinyl tris-(methyl ethyl ketoximino) silane, and 2.5 (0.00648 moles) parts by weight of methyl tris-(methyl isobutyl ketoximino)silane as cross-linker. This combination of silanes was mixed for 18 seconds in the same mixer. Next was added 8.0 parts by weight of a dimethyldichlorosilane treated fumed silica (150 $m^2/gm$ surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with an initial high residual odor lasting several days (see Table II). After a heptane extraction of the uncured sealant, the fee MEKO content was measured by Gas Chromatography to be less than 1%.

Composition 13:

Similar to composition 12, a silanol terminated polydimethylsiloxane (66.1) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added a combination of 2.0 (0.00664 moles) parts by weight of methyl tris-(methyl ethyl ketoximino)silane, and 2.5 (0.00629 moles) parts by weight of vinyl tris-(methyl isopropyl ketoximino)silane as cross-linker. This combination of silanes was mixed for 18 seconds in the same mixer. Next was added 8.0 parts by weight of a dimethyldichlorosilane treated fumed silica (150 $m^2/gm$ surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with very low residual odor in the first 48 hours and was odor free after 72 hours (see Table III). After a heptane extraction of the uncured sealant, the fee MEKO content was measured by Gas Chromatography to be less than 1%.

Composition 13(A):

An identical composition was made to that of composition 13, except that vinyl tris-(methyl propyl ketoximino)silane was substituted as cross-linker for methyl tris-(methyl isopropyl ketoximino)silane. The resulting rubber cured with very low residual odor in the first 48 hours and was odor free after 72 hours (see Table III). After a heptane extraction of the uncured sealant, the fee MEKO content was measured by Gas Chromatography to be less than 1%.

Comparative Composition 13(B):

As in composition 13, a silanol terminated polydimethylsiloxane (66.1) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added a combination of 2.0 (0.00664 moles) parts by weight of methyl tris-(methyl ethyl ketoximino)silane, and 2.8 (0.00726 moles) parts by weight of methyl tris-(methyl isobutyl ketoximino)silane as cross-linker. This combination of silanes was mixed for 18 seconds in the same mixer. Next was added 8.0 parts by weight of a dimethyldichlorosilane treated fumed silica (150 m²/gm surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with very low residual odor in the first 48 hours and was odor free after 72 hours (see Table III). After a heptane extraction of the uncured sealant, the fee MEKO content was measured by Gas Chromatography to be less than 1%.

Composition 14:

As in composition 13, a silanol terminated polydimethylsiloxane (66.4) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added a combination of 3.5 (0.01161 moles) parts by weight of methyl tris-(methyl ethyl ketoximino)silane, and 1.0 (0.00281 moles) parts by weight of vinyl tris-(methyl isopropyl ketoximino)silane as cross-linker. This combination of silanes was mixed for 18 seconds in the same mixer. Next was added 8.0 parts by weight of a dimethyldichlorosilane treated fumed silica (150 m²/gm surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with very low residual odor in the first 48 hours and was odor free after 72 hours (see Table III). After a heptane extraction of the uncured sealant, the fee MEKO content was measured by Gas Chromatography to be greater than 1%.

Composition 15:

Similarly to composition 14, a silanol terminated polydimethylsiloxane (66.4) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added a combination of 4.0 (0.01327 moles) parts by weight of methyl tris-(methyl ethyl ketoximino)silane, and 0.50 (0.00141 moles) parts by weight of vinyl tris-(methyl isopropyl ketoximino)silane as cross-linker. This combination of silanes was mixed for 18 seconds in the same mixer. Next was added 8.0 parts by weight of a dimethyldichlorosilane treated fumed silica (150 m²/gm surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with very low residual odor in the first 48 hours and was odor free after 72 hours (see Table III). After a heptane extraction of the uncured sealant, the fee MEKO content was measured by Gas Chromatography to be greater than 1%.

Composition 16:

Similarly to composition 15, a silanol terminated polydimethylsiloxane (66.9) parts by weight, having a viscosity at 25° C. of 50,000 cP was thoroughly mixed with a triorganosilyl endblocked diorganopolysiloxane (20 parts by weight) having a viscosity of 1000 cP at 25° C. The components were mixed in a Hauschild mixer for 18 seconds. To this mixture was added a combination of 3.0 (0.00995 moles) parts by weight of methyl tris-(methyl ethyl ketoximino)silane, and 1.0 (0.00370 moles) parts by weight of methyl vinyl bis-(methyl isopropyl ketoximino)silane as cross-linker. This combination of silanes was mixed for 18 seconds in the same mixer. Next was added 8.0 parts by weight of a dimethyldichlorosilane treated fumed silica (150 m²/gm surface area) mixed in the same manner. To this mixture 1.0 parts by weight of gamma-aminopropyltriethoxysilane was added and similarly mixed. Dibutyltindilaurate was added last (0.10 parts by weight) and mixed for 18 seconds in the Hauschild mixer. The resulting rubber cured with very low residual odor in the first 48 hours and was odor free after 72 hours (see Table III). After a heptane extraction of the uncured sealant, the fee MEKO content was measured by Gas Chromatography to be no more than 1%.

TABLE 1

| | Composition # | | | | | | | | |
|---|---|---|---|---|---|---|---|---|---|
| | 8 | 8(A) | 8(B) Comparative | 9 | 9(A) | 9(B) Comparative | 10 | 10(A) | 10(B) Comparative |
| Cross-linker/s* | MIPKOS | MPKOS | MIBKOS | MIPKOS[1] MOS VOS | MPKOS MOS VOS | MIBKOS MOS VOS | MIPKOS | MPKOS | MIBKOS |
| Residual odor level @ 24 hrs | 3 | 3 | 6 | 2 | 2 | 6 | 2 | 2 | 6 |
| Residual odor level @ 48 hrs | 2 | 2 | 5 | 0 | 0-1 | 4 | 1 | 1-2 | 4 |
| Residual odor level @ 72 hrs | 1 | 1 | 4 | 0 | 0 | 4 | 0-1 | 0-1 | 3 |
| Residual odor level @ 96 hrs | 0 | 0 | 2 | 0 | 0 | 1-2 | 0 | 0 | 2 |
| Free MEKO level | <1.0% | <1.0% | <1.0% | <1.0% | <1.0% | <1.0% | <1.0% | <1.0% | <1.0% |

*MIPKOS = methyl tris-(methyl isopropyl ketoxime) silane
*MIBKOS = methyl tris-(methyl isobutyl ketoxime) silane
*MOS = methyltris(methyl ethylketoxime)silane
*VOS = vinylltris(methyl ethylketoxime)silane
Odor level
5-6 = high (strong);
3-4 = medium;
2 = low;
1 = slight;
0 = none

TABLE 2

| | Composition # | | | | | | |
|---|---|---|---|---|---|---|---|
| | 11 | 11(A) | 11(B) Comparative | 12 | 12(A) | 12(B) | 12(C) Comparative |
| cross-linkers* | MIPKOS MOS VOS | MPKOS MOS VOS | MIBKOS MOS VOS | MIPKOS MOS VOS | MPKOS MOS VOS | MIBKOS MOS VOS | MIBKOS MOS VOS |
| Residual odor level @ 24 hrs | 2-3 | 2-3 | 5-6 | 1-2 | 1-2 | 5-6 | 5-6 |
| Residual odor level @ 48 hrs | 2 | 2 | 4 | 0-1 | 0-1 | 4 | 4 |
| Residual odor level @ 72 hrs | 0-1 | 0-1 | 3-4 | 0 | 0 | 3 | 3 |
| Residual odor level @ 96 hrs | 0 | 0 | 2 | 0 | 0 | 2 | 3 |
| Free MEKO level | <1.0% | <1.0% | <1.0% | <1.0% | <1.0% | <1.0% | <1.0% |

TABLE 3

| | Composition # | | | | | |
|---|---|---|---|---|---|---|
| | 13 | 13(A) | 13(B) Comparative | 14 | 15 | 16 |
| cross-linker* | VIPKOS MOS | VPKOS MOS | MIBKOS MOS | VIPKOS MOS | MIBKOS MOS | MVIPKOS MOS |
| Residual odor level @ 24 hrs | 1-2 | 2 | 5-6 | 1-2 | 1 | 2 |
| Residual odor level @ 48 hrs | 1 | 1 | 4 | 0-1 | 0-1 | 1 |
| Residual odor level @ 72 hrs | 0-1 | 0-1 | 3 | 0 | 0 | 0-1 |
| Residual odor level @ 96 hrs | 0 | 0 | 2 | 0 | 0 | 0 |
| Free MEKO level | <1.0% | <1.0% | <1.0% | >1.0% | >1.0% | <1.0 |

*VIPKOS = vinyl tris-(methyl isopropyl ketoxime) silane
*VPKOS = vinyl tris-(methyl propyl ketoxime) silane
*MVIPKOS = methylvinyl bis-(methyl isopropyl ketoxime) silane

Having thus described a few particular embodiments of the invention, it will be apparent to those skilled in the art, in view of the teachings contained herein, that various alterations, modifications, and improvements not specifically described are available and within the scope of the present invention. Such alterations, modifications, and improvements, as are made obvious by this disclosure, are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A sealant composition comprising organosiloxane polymeric units having at least one terminal moiety according to Formula I:

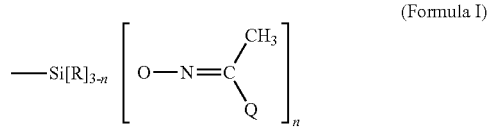

(Formula I)

wherein

Q is

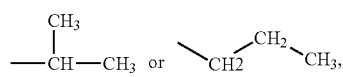

R is independently selected from a branched or straight chain $C_1$-$C_8$ alkyl or alkoxy, $C_3$-$C_6$ cylcoalkyl, $C_2$-$C_5$ alkenyl, or aryl, and n is 2 or 3, wherein said organosiloxane polymeric units are reaction products of:

(I) a hydroxyl end-capped organosiloxane having a structure according to Formula II(b):

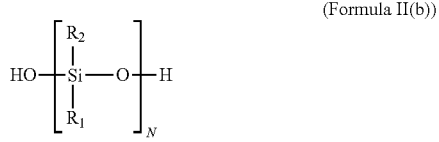

(Formula II(b))

wherein $R_1$ and $R_2$ are independently selected from methyl, ethyl, propyl, butyl, phenyl, methylphenyl, ethylphenyl, vinyl, allyl, cyclohexyl, tolyl, isopropyl, chloropropyl, 3,3,3-trifluoropropyl, chlorophenyl, beta-(perfluorobutyl)ethyl, and chlorocyclohexyl, and N is a number such that the hydroxyl end-capped organosiloxanes have a viscosity from about 2000 to about 150,000 centipoise at 25° C. and (II) a silane cross-linking agent comprising a compound according to Formula III:

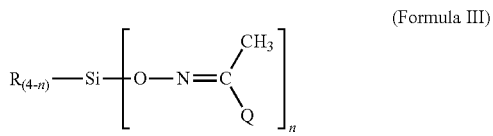

(Formula III)

wherein R is as defined above in Formula I and n is 3 or 4;
wherein the sealant composition further comprises:
a catalyst that is present in an amount from 0.001 to 1.0% in the composition.

2. The sealant composition of claim 1 wherein, in Formula I, n=2 and R is methyl, ethyl, vinyl, or phenyl.

3. The sealant composition of claim 2 wherein Q is

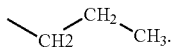

4. The sealant composition of claim 2 wherein Q is

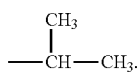

5. The sealant composition of claim 1 wherein said organosiloxane polymeric units have a viscosity from about 2000 to about 150,000 centipoise at 25° C.

6. The sealant composition of claim 5 wherein, in Formula II(b),
$R_1$ and $R_2$ are independently selected from methyl, ethyl, phenyl, vinyl, and 3,3,3-trifluoropropyl.

7. The sealant composition of claim 1 wherein, in Formula III, R is independently methyl, ethyl, vinyl, or phenyl.

8. The sealant composition of claim 7 wherein Q is

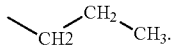

9. The sealant composition of claim 7 wherein Q is

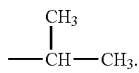

10. The sealant composition of claim 1 wherein said silane cross-linking agent is selected from the group consisting of methyl tris-(methyl isopropyl ketoximino) silane, vinyl tris-(methyl isopropyl ketoximino)silane phenyl tris-(methyl isopropyl ketoximino)silane, ethyl tris-(methyl isopropyl ketoximino)silane, tetrakis-(methyl isopropyl ketoximino)silane, methyl tris-(methyl propyl ketoximino)silane, vinyl tris-(methyl propyl ketoximino)silane, phenyl tris-(methyl propyl ketoximino) silane, ethyl tris-(methyl propyl ketoximino)silane, and tetrakis-(methyl propyl ketoximino) silane.

11. The sealant composition of claim 1 wherein said silane cross-linking agent is selected from the group consisting of tris-(methyl isopropyl ketoximino)(methoxy)silane, tris-(methyl isopropyl ketoximino)(ethoxy)silane, tris-(methyl propyl ketoximino)(methoxy)silane, and tris-(methyl propyl ketoximino)(ethoxy)silane.

12. The composition of claim 1, wherein the catalyst is an organotin catalyst.

13. The composition of claim 12, wherein the organotin catalyst is dibutyltinlaurate.

14. The composition of claim 1, further comprising a plasticizer comprising a triorganosilyl end-blocked diorganopolysiloxane having a viscosity from 10 to 100,000 centipoise at 25° C.

15. The composition of claim 14, wherein the triorganosilyl end-blocked diorganopolysiloxane is present in the composition in an amount from 15 to 20% by weight.

16. The composition of claim 1, further comprising a filler.

17. The composition of claim 16, wherein the filler is a reinforcing filler, a non-reinforcing filler, or a mixture thereof.

18. The composition of claim 17, wherein the filler comprises silica, calcium carbonate, or a mixture thereof.

19. The composition of claim 1, further comprising a silane adhesion promoter.

20. The composition of claim 19, wherein the silane adhesion promoter is an aminopropylalkoxysilane.

21. The composition of claim 20, wherein the silane adhesion promoter is present in the composition in an amount from about 0.001 to about 2.5% by weight.

22. A sealant composition comprising organosiloxane polymeric units having at least one terminal moiety according to Formula I:

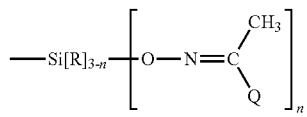
(Formula I)

wherein
Q is

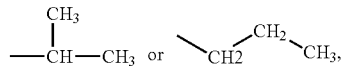

R is independently selected from a branched or straight chain $C_1$-$C_8$ alkyl or alkoxy, $C_3$-$C_6$ cylcoalkyl, $C_2$-$C_5$ alkenyl, or aryl, and
n is 2 or 3,
wherein said organosiloxane polymeric units are reaction products of:
(I) a hydroxyl end-capped organosiloxane having a structure according to Formula II(b):

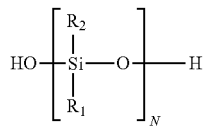
(Formula II(b))

wherein $R_1$ and $R_2$ are independently selected from methyl, ethyl, propyl, butyl, phenyl, methylphenyl, ethylphenyl, vinyl, allyl, cyclohexyl, tolyl, isopropyl, chloropropyl, 3,3,3-trifluoropropyl, chlorophenyl, beta-(perfluorobutyl)ethyl, and chlorocyclohexyl, and N is a number such that the hydroxyl end-capped organosiloxanes have a viscosity from about 2000 to about 150,000 centipoise at 25° C. and (II) a silane cross-linking agent comprising a compound according to Formula III:

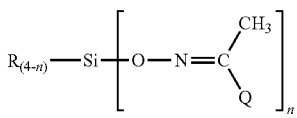
(Formula III)

wherein R is as defined above in Formula I and n is 3 or 4;
wherein the hydroxyl end-capped organosiloxane, prior to reaction with the silane cross-linking agent, represents from 39.15 to 66.9% by weight of the sealant composition; and wherein the silane cross-linking agent, prior to reaction with the hydroxyl end-capped organosiloxane, represents from 2 to 5.7% by weight of the sealant composition.

* * * * *